United States Patent [19]

Polley

[11] Patent Number: 4,602,453

[45] Date of Patent: Jul. 29, 1986

[54] SCENT LURE

[76] Inventor: Joseph A. Polley, P.O. Box 361, Massapequa, N.Y. 11758

[21] Appl. No.: 688,822

[22] Filed: Jan. 4, 1985

[51] Int. Cl.⁴ ............................................... A01K 85/00
[52] U.S. Cl. ................................... 43/44.99; 43/42.06
[58] Field of Search ................. 43/42.06, 44.99, 42.31, 43/42.1, 44.9, 42.36

[56] References Cited

U.S. PATENT DOCUMENTS

| | | | |
|---|---|---|---|
| 2,741,864 | 4/1956 | Shotton | 43/42.31 |
| 2,987,844 | 6/1961 | Hill | 43/42.06 |
| 3,453,768 | 7/1969 | Feaster | 43/42.06 |
| 3,798,823 | 3/1974 | Watters | 43/42.06 |

*Primary Examiner*—Nicholas P. Godici
*Assistant Examiner*—G. M. Reid
*Attorney, Agent, or Firm*—Richard L. Miller

[57] ABSTRACT

An arrangement for attracting a fish and including a hollow bait fish-like body containing an internal hook, a float in fluid communication with the bait fish-like body via a hollow tube, and a concentrated scented fluid stored in the float and released into the bait fish-like body through the tube, the bait fish-like body having gills so that the scented fluid is discharged into the water to attract the fish.

6 Claims, 6 Drawing Figures

U.S. Patent  Jul. 29, 1986  4,602,453
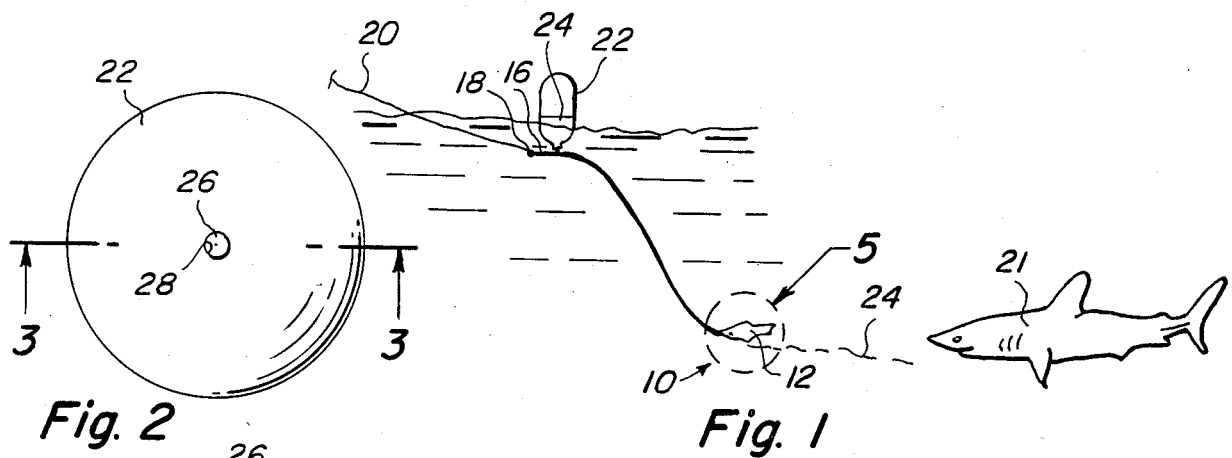
Fig. 2
Fig. 1
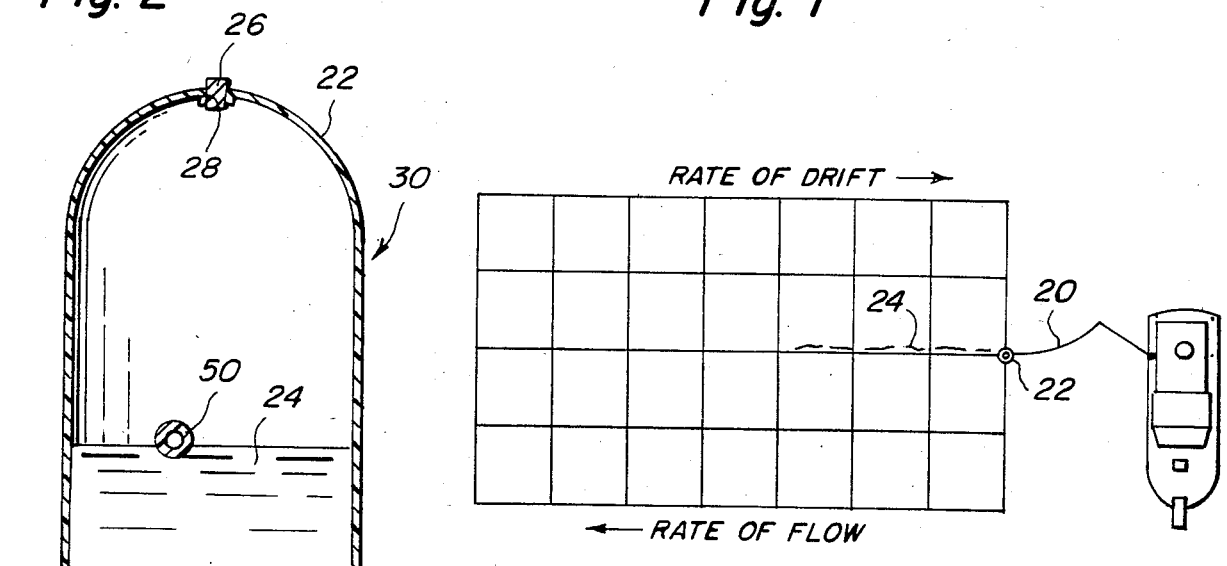
Fig. 3
Fig. 4 — RATE OF DRIFT / RATE OF FLOW
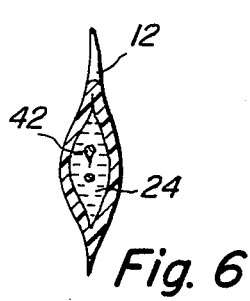
Fig. 6
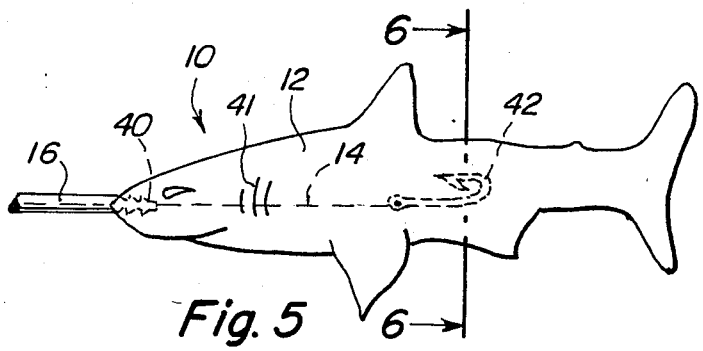
Fig. 5

SCENT LURE

BACKGROUND OF THE INVENTION

The present invention relates to fish lures. More particularly, it relates to fish lures which are scented.

Fish lures of the above-related general type are known in the art. Fishing is a sport that many people enjoy and the use of a lure to attract fish is common knowledge. However, even the best of lures can not assure a catch.

SUMMARY OF THE INVENTION

Accordingly, it is the primary object of the present invention to provide a bait fish lure which avoids the disadvantages of the prior art.

Another object of the present invention is to provide a bait fish lure which releases a concentrated scented liquid that attracts fish.

Yet another object of the present invention is to provide a bait fish lure whose concentrated scented liquid is stored in a float and whose hook is concealed within the lure.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a side view of the invention being used in the ocean to lure, attract, and catch sharks.

FIG. 2 is a top view of the scent lure container.

FIG. 3 is a cross sectional view taken on line 3—3 in FIG. 2 with parts broken away.

FIG. 4 is a top view of a boat with a fishing line attached to the invention showing the rate of drift, and rate of flow in a graphical form.

FIG. 5 is an enlarged view of the lure bait fish illustrated in the dotted circle of FIG. 1.

FIG. 6 is a cross sectional view taken on line 6—6 in FIG. 5.

DETAILED DESCRIPTION OF THE PREFERRED EMBODIMENT

Referring now to FIG. 1, the scent lure of the present invention is shown generally at 10 and is formed as a bait fish 12. The lure 10 is attached to a wire leader 14 which passes through a clear tube 16 and attaches to a swivel 18. The swivel 18 is then attached to a fishing line 20 which is attached to a fishing reel and rod (not shown). A plastic bottle 22 is attached to the clear tube 16 and is partially filled with a liquid 24 which is scented and may be blood or a suitable chemical equivalent so as to attract a fish 21.

A top view of the bottle 22 is shown in FIG. 2 and contains a rubber stopper 26 which closes a filling hole 28.

The bottle 22 and the tube 16 form a float assembly 30 which is shown in detail in FIG. 3. The bottle 22 is attached to the tube 16 by a tee connector 32. The bottle 22 further contains a ball 50 which floats on the liquid 24 and rattles to attract the fish 21. The tee connector 32 is secured in a throughbore 34 of the bottle 22 by a rubber stopper 36. The end of the tube 16 closest the swivel 18 is secured by a stopper 38 while the other end of the tube is secured by a sinker lead weight 40. The wire leader 14 terminates in a hook 42.

FIG. 4 depicts the flow rate of the liquid 24 as a function of the rate of drift of the float bottle 22.

The details of the scent lure 10 are shown in FIG. 5. The bait fish 12 is attached to the tube 16 at the lead sinker 40. The wire leader 14 passes through the tube 16, through the sinker 40 and terminates at the hook 42 disposed internally to the bait fish 12. The hook 42 is submerged in the liquid 24 within the bait fish 12, as can be seen in FIG. 6.

In operation, the liquid 24 in the bottle 22 is steadily released through the bait fish 12 into the surrounding water. The scented liquid 24 leaves a slick scent which attracts fish 21 from miles away. The wire leader 14, which can be any thickness, passes through the clear tube 16, through the tee 32, and through the rubber stopper 38 cemented to the end of the plastic tube 16. Tee 32 may easily detach from the rubber stopper 36 upon a strong strike by a fish to facilitate gaffing the fish by the fisherman.

The bottle 22 is partially filled with the liquid 24, through the throughbore 28. The liquid 24 flows the length of the tube 16 and exits out the opening 29 (FIG. 3) in front of the sinker 40 but inside the bait fish 12. The liquid 24 flows through the gill slits 41 of the bait fish 12.

To operate, one squeezes the bottle 22 with the stopper 26 in place until the liquid 24 starts flowing out of the gills 41 of the bait fish 12. At this point, the stopper 26 is removed and the float assembly 30 is placed in the water to float away from the boat.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An arrangement for attracting a fish, comprising:
   (a) a lure having discharge means;
   (b) a float for storing scented fluid;
   (c) a tube spacing said lure from said float and providing flow communication from said float to said lure;
   (d) a continuous fishing line, said fishing line having a first line segment connected to a first end of said tube for connection to a fishing reel and rod, said fishing line having a second line segment passing through said tube and, said fishing line having a third line segment connected to a second end of said tube for connection to a fishing hook;
   (e) siphon means in said float for providing a self-sustaining continuous flow of the scented fluid from said float to said lure so that said lure can be filled with said fluid and be discharged from said lure so as to atract the fish.

2. An arrangement as defined in claim 1, wherein said lure is a hollow bait fish-like body having gills through which said fluid is discharged.

3. An arrangement as defined in claim 2, wherein said hollow bait fish contains an internal hook.

4. An arrangement as defined in claim 3; further comprising a ball disposed internally to said float so as to create a rattling sound to attract the fish.

5. An arrangement as defined in claim 1, wherein said float is a squeezable bottle, and said siphon means comprises a stopper removable from an opening in the upper part of the float, and weight means on said tube for retaining the tube beneath the surface of the water.

6. An arrangement as in claim 1 and comprising a removable plug means at the lower end of the float interconnecting the tube to the float and deteachable upon a strong strike by a fish.

* * * * *